United States Patent
Schroll et al.

[11] Patent Number: 5,366,773
[45] Date of Patent: Nov. 22, 1994

[54] TUBULAR PULTRUDED MEMBER HAVING UNIFORM WALL THICKNESS

[75] Inventors: Ross E. Schroll, Fairport; Joseph A. Swift, Ontario; Peter A. Sardano, Fairport, all of N.Y.

[73] Assignee: Xerox Corporation, Stamford, Conn.

[21] Appl. No.: 993,845

[22] Filed: Dec. 21, 1992

[51] Int. Cl.⁵ .............................................. B29D 22/00
[52] U.S. Cl. ................................ 428/36.9; 428/36.1; 428/36.91; 428/120; 428/178; 264/171; 264/174; 156/166; 156/180; 156/433
[58] Field of Search .................... 428/36.1, 36.9, 36.91; 156/166, 180, 433; 264/171, 174

[56] References Cited

U.S. PATENT DOCUMENTS

| | | | |
|---|---|---|---|
| 2,751,320 | 6/1956 | Jacobs et al. | 154/91 |
| 3,470,051 | 9/1969 | Meyer | 156/171 |
| 4,300,321 | 11/1981 | Preis et al. | 52/223 |
| 5,092,950 | 3/1992 | Spoo et al. | 156/180 |
| 5,264,170 | 11/1993 | Strachan | 264/70 |

FOREIGN PATENT DOCUMENTS

| | | |
|---|---|---|
| 0017010 | 5/1980 | European Pat. Off. |
| 9110024 | 7/1991 | WIPO |

OTHER PUBLICATIONS

Patent Abstracts of Japan vol. 17, No. 117(M-1378)11 11 Mar. 1993 and JP-A-04 301-436 (SekisuiChem) 26 Oct. 1992.

*Primary Examiner*—George F. Lesmes
*Assistant Examiner*—Chris Raimund

[57] ABSTRACT

The method of making a tubular pultruded member having a longitudinal axis and a substantially uniform wall thickness throughout includes providing a heated die with a mandrel extending through the forming die section and a bath of liquid polymer, simultaneously pulling continuous reinforcing fibers and at least one carrier tape with wall spacers through the liquid polymer bath around the mandrel and into and through the heated die to shape and cure the liquid polymer into a tubular pultruded member, the wall spacers having a thickness equal to the uniform distance between the outside surface of the mandrel and the inside surface of the die.

12 Claims, 4 Drawing Sheets

TUBULAR PULTRUDED MEMBER HAVING UNIFORM WALL THICKNESS

CROSS REFERENCE TO RELATED APPLICATION

Attention is directed to application Ser. No. 07/994,224 filed concurrently herewith, entitled "Pultruded Member With Functional Features" which is commonly assigned to the assignee of the present invention.

BACKGROUND OF THE PRESENT INVENTION

The present invention relates generally to pultruded members and in particular to tubular pultruded members having uniform wall thickness as well as methods of making such tubular pultruded members.

The pultrusion process generally consists of pulling continuous lines of fibers through a resin bath or impregnator and then into a preforming fixture where the section is partially shaped and excess resin and/or air are removed and then into heated dies where the section is cured continuously. Typically, the process is used to make fiber glass reinforced pultruded shapes. For a detailed discussion of pultrusion technology, reference is directed to "Handbook of Pultrusion Technology" by Raymond W. Meyer, first published 1985 by Chapman & Hall, New York which is hereby incorporated by reference in its entirety herein. In the pultrusion process the fibers are submersed in a polymer bath and drawn through a die opening of suitable shape and high temperature to produce a solid piece of dimensions and shapes of the die which can be cut, shaped and machined. Typically, holes, slots, ridges, grooves, contact areas or screw threads may be formed in the pultruded composite member by conventional machining techniques. Alternatively, the pultrusion process maybe modified such that when the pultrusion is initially removed from the die it is pliable and can be bent or otherwise shaped to a form which upon further curing becomes a rigid structural member. Further, if the resin is a thermoplastic the process can be adjusted such that the part is removed hot from the die, shaped and then cooled to solidify or subsequently heated, formed and then cooled.

In making tubular or hollow pultruded members a mandrel is installed to span from ahead of the polymer bath through the forming die section in the heated die and often totally through the heated die itself. The internal hole feature of the tubular pultruded member is created by a cantilevered mandrel of the desired internal shape supported only at the rear portion of the pultrusion machine. As a result, the cantilevered mandrel floats relative to the heated die and due to its length and weight which is unsupported provides variations in wall thickness of the final pultruded member. In addition, since the rovings and mat reinforcement used in the pultrusion manufacturing process may in themselves vary by up to ±15% in thickness a further thickness variable in the final pultruded member can be created. Accordingly, the tolerances in the pultrusion process are much greater than those from injection molding processes and are typically of the order of ±20% on wall thicknesses for major dimensions less than two inches. By comparison, injection molding parts may have a ±2%, or even ±0.5% tolerance in thickness. As a result it is difficult if not impossible to use together or interchangeably structural tubular parts made from both an injection molding process and a pultrusion process.

One technique that has previously been used to minimize these difficulties in obtaining uniform wall thickness is to have the pultrusion process run as a vertical process wherein the mandrel is centered more by gravity within the center of the heated die. However, this is a very expensive process, particularly in that it requires an extremely tall building to accommodate the larger pultruded members.

SUMMARY OF THE INVENTION

The present invention is directed to a process for producing tubular pultruded members having substantially uniform wall thicknesses and to the resultant, tubular pultruded members. In particular, the present invention is directed to providing solid spacers in the wall of the tubular pultruded member which possess the dimensions of the walls to control the wall thickness.

In a principle aspect of the present invention the method of making a tubular pultruded member having a substantially uniform wall thickness comprises simultaneously pulling continuous reinforcing fibers and at least one carrier tape with wall spacers thereon through the liquid polymer bath around said mandrel and into and through the heated die to shape and cure the liquid polymer into the tubular pultruded member. The wall spacers having a thickness equal to the uniform distance between the outside surface of the mandrel and the inside surface of the die.

In a further aspect of the present invention the wall spacers are used to control the wall thickness of the tubular pultruded member and are oriented in the polymer matrix in a direction substantially parallel to the longitudinal axis of the pultruded member.

In a further aspect of the present invention the tubular pultruded member has a substantially rectangular cross section and at least two sides thereof have wall spacers embedded therein and parallel to the longitudinal axis of the pultruded member.

In a further aspect of the present invention the pultruded member is a substantially rectangular cross section and all four sides thereof have wall spacers embedded therein and parallel to the longitudinal axis of the pultruded member.

In a further aspect of the present invention the pultruded member has a substantially circular cross section with a substantially uniform wall thickness.

In a further aspect of the present invention the wall spacers are uniformly spaced apart in the direction of the longitudinal axis of the pultruded member and are on or in a carrier tape.

BRIEF DESCRIPTION OF THE DRAWINGS

The invention is illustrated with reference to the following representative figures in which the dimensions of parts are not necessarily to scale but rather may be exaggerated or distorted for clarity of illustration and ease of description.

DETAILED DESCRIPTION OF THE PREFERRED EMBODIMENTS

In accordance with the present invention a tubular pultruded member and method of making same, are provided wherein the tubular pultruded member has a substantially uniform wall thickness throughout provided by a series of wall spacers embedded in the tubular pultruded member having a thickness equal to the uniform distance between the outside surface of the mandrel and the inside surface of the die. By the term "uniform distance" it is intended to define the distance between the outside surface of the mandrel and the inside surface of the die if the mandrel and the die were precisely positioned relative to each other so that the distance therebetween along any longitudinal axis would be substantially uniform. Accordingly, it defines for example, a tubular pultruded member having a square cross section wherein each of the four sides have substantially the same wall thickness in cross section and also along each of the four longitudinal axes of the pultruded member. It also means that a similar tubular pultruded member may have two parallel sides, for example, having the same uniform wall thickness and two perpendicular sides having the same uniform, but different, wall thicknesses. Similarly, it includes a substantially circular tubular pultruded member wherein the wall thickness through a cross section as well as along any longitudinal axis is substantially uniform.

Figure 1:
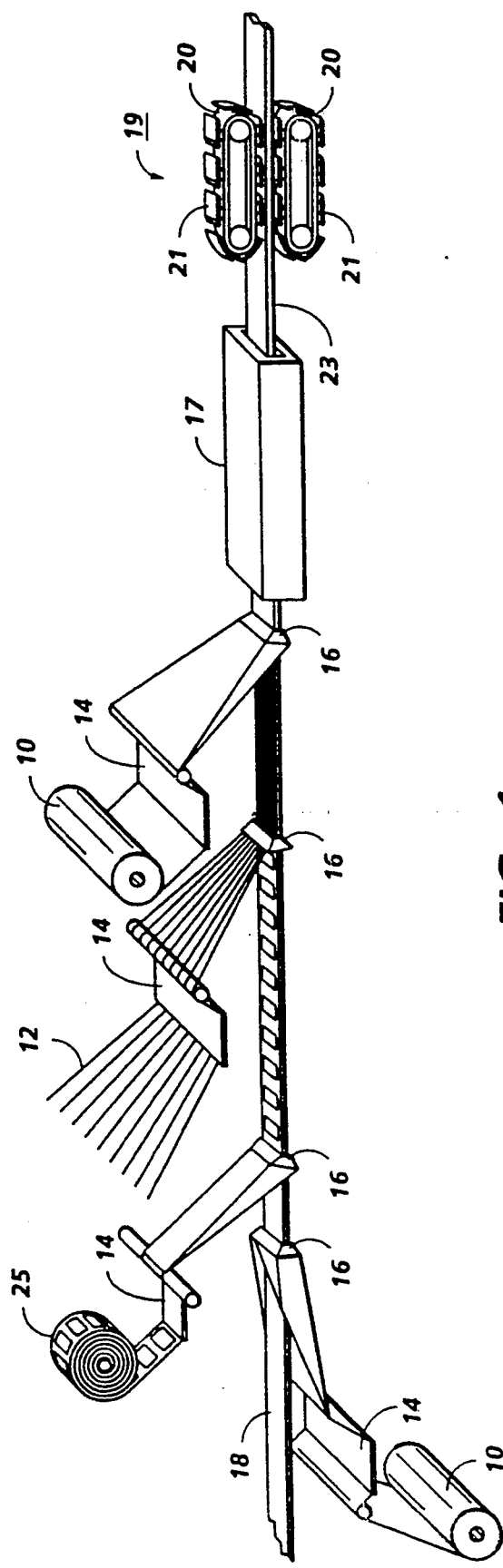
FIG. 1 is an isometric representation of a typical pultrusion apparatus and process to produce a tubular pultruded member according to the present invention.
Figure 2:
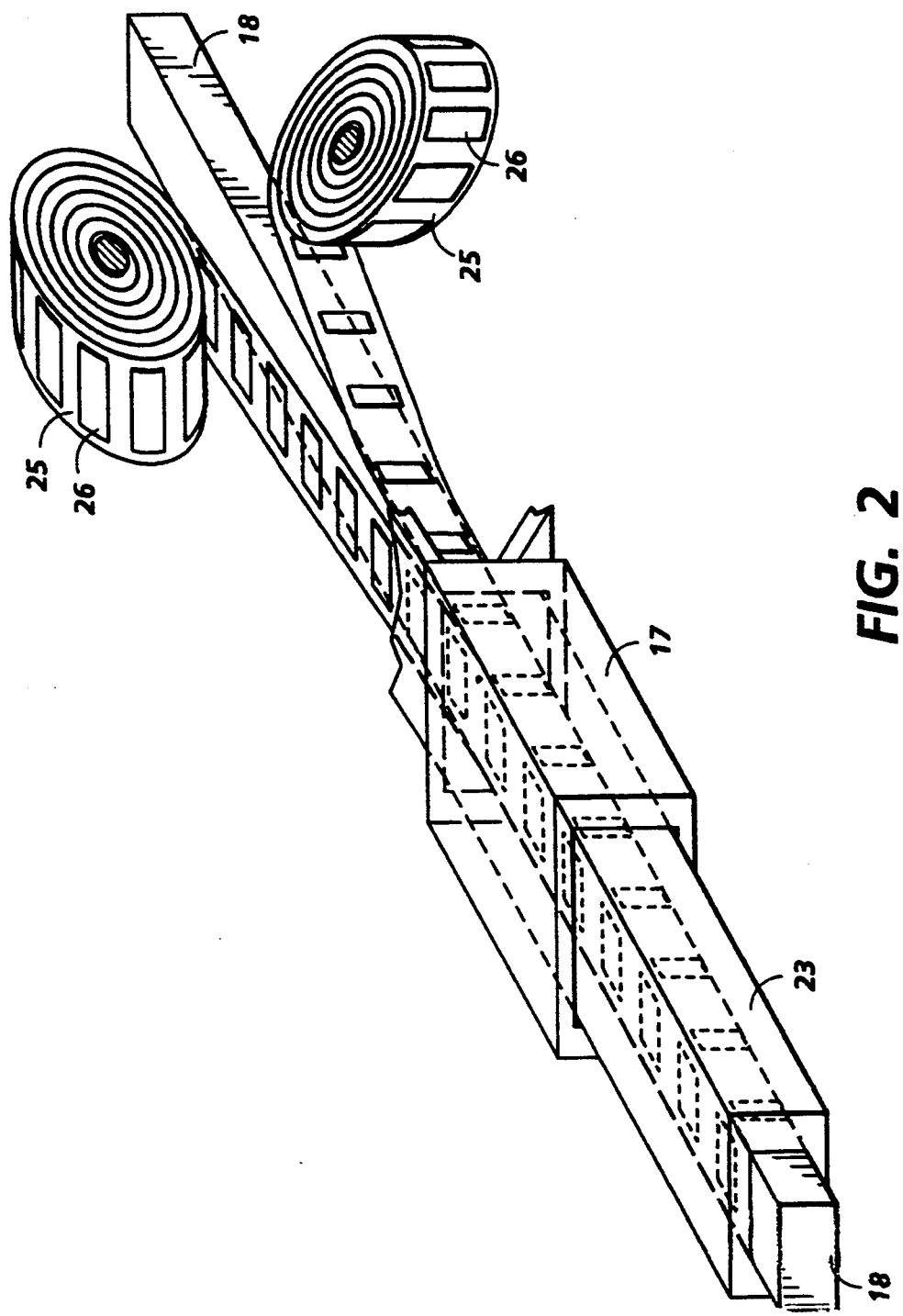
FIG. 2 is an enlarged isometric view of the die and mandrel in the pultrusion apparatus wherein two sides of the pultrusion have the wall spacers present.
Figure 3A:
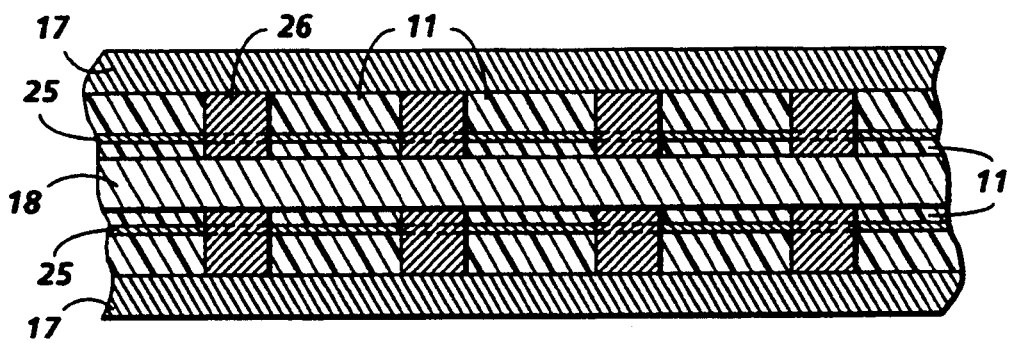
FIGS. 3A and 3B are cross sections of tubular pultruded members being formed in the pultrusion apparatus of FIG. 1 illustrating the position of the spacers relative to the mandrel and the heated die.
Figure 3B:
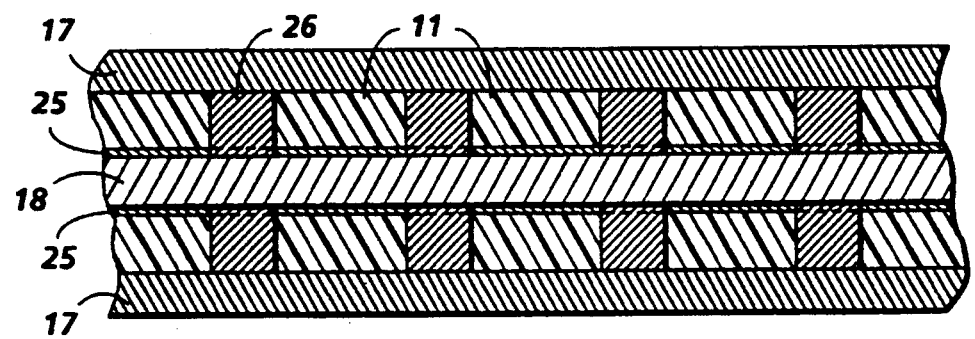

Turning now to FIGS. 1 and 2 the invention will be described in greater detail. In FIG. 1 the typical hollow pultrusion process is illustrated wherein continuous mat reinforcement 10 and roving 12 are first submerged in a liquid polymer baths 14 then formed through preforming dies 16 around a mandrel 18 which extends through the forming die section and through the heated die 17. The pulling section 19 is illustrated as a pair of continuous caterpillar type belts 20 containing pads 21 that engage the pultrusion 23. The carrier tape 25 with the spacers 26 according to the present invention (see FIG. 2) is typically supplied to the mandrel surface after having been pulled through a liquid polymer bath 14 and accordingly, the carrier tape with the wall spacers and the reinforcing fibers are simultaneously pulled around the mandrel and into and through the heated die to shape and cure the liquid polymer into the tubular pultruded member. As illustrated in the cross sections of FIGS. 3A and 3B the spacers on the top and bottom of the tubular pultruded member have a thickness equal to the uniform distance between the outside of the mandrel and the inside surface of the die. FIG. 3A illustrates the embodiment wherein the spacers 26 extend through the carrier tape 25 while FIG. 3B illustrates the spacers being in the surface of the carrier tape 25. The surfaces of the mandrel and die should be chosen from appropriately hard materials to resist abrasion and scratching which may arise from the sliding action of the solid spacers against the die and mandrel surfaces. In FIGS. 3A and 3B the polymer matrix 11 includes any mat reinforcement 10 and roving 12 as shown in FIG. 1. As may be observed in FIG. 3A the polymer matrix 11 is between the inside of the heated die 17 and the carrier tape 25 and in FIG. 3B the polymer matrix 11 extends between the carrier tape 25 which is in contact with the mandrel 18 to the inside of the heated die 17.

The roving or tow, which is similar to a yarn, provides a continuous fiber reinforcement, which is aligned axially along the longitudinal axis of the tubular pultruded member. Typically, the rovings are fiberglass, but they may be of other fibers as well such as carbon, aromatic polyamide fibers such as Kevlar TM or any fiber that can be used as a reinforcing component. The mat reinforcement which may be woven or nonwoven provides fibers which are both axially and nonaxially oriented in a thin layer enhances transaxial mechanical properties as well as improves surface properties by way of enhancing abrasion resistance, weather resistance, etc. As with the rovings, the mat reinforcement may be selected from virtually any suitable fibrous material that is capable of withstanding the temperatures required in the pultrusion process. Typically, they are fiberglass, polyester, nylon, propylene, polyimide and the like. Typically the fiber loading including all rovings and mats is from about 50% to about 90% by weight of the total of the polymer matrix and fiber. In certain applications, the carrier tape with wall spacers according to the present invention may be used to replace the reinforcement mat or alternatively be in addition to it.

Any suitable polymer matrix may be employed in the practice of the present invention. The polymer may be insulating or conducting. If cross directional electrical connection is desired along the edges of the pultrusion a conducting polymer or conductive additives to the polymer may be used. Conversely, if insulating properties are desired along the edges of the pultrusion an insulating polymer may be used, or insulating fibers can be used in the outer periphery of the pultruded configuration and conducting fibers can be configured to reside away from the edges.

Typically, the polymer is selected from the group of structural thermoplastic and thermosetting resins. Polyesters, epoxies, vinyl esters, polyetheretherketones, polyetherimides, polyethersulphones, high density polyethylenes, polycarbonates, acrylonitrile-butadiene-styrenes (ABS), polypropylene and nylon are in general, suitable materials with the thermosetting polyesters being preferred due to their short cure time, relative chemical inertness and low cost. If an elastomeric matrix is desired, a silicone, fluorosilicone or polyurethane elastomer may be chosen for the polymer matrix. Typical specific materials include Hetron 613, Arpol 7030 and 7362 available from Oshland Oil, Inc., Dion Iso 6315 available from Koppers Company, Inc. and Silmar S-7956 available from Vestron Corporation. For additional information on suitable resins attention is directed to Chapter 4 of the above-referenced Handbook by Meyer. Other materials may be added to the polymer bath to provide improved properties such as weather corrosion or flame resistance as desired. In addition, the polymer bath may contain fillers such as calcium carbonate, alumina, silica or pigments to provide a certain color or lubricants to reduce friction, for example, in sliding members. Further additives to alter the viscosity, surface tension or to assist in bonding the pultrusion to the other materials may be added. Naturally, if the fiber has an organic sizing applied to it, a compatible polymer should be selected. For example, if an epoxy resin is being used, it would be appropriate to add an epoxy sizing to the fiber to promote adhesion.

Figure 7:
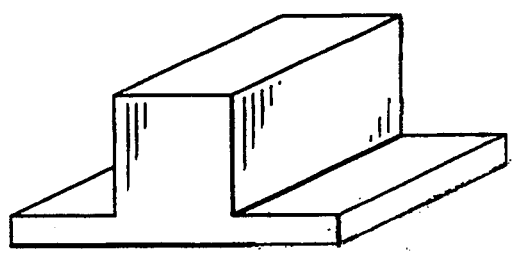
FIG. 7 is a cross sectional view of a spacer which is itself a pultrusion which may be used in small sections as spacers or in a continuous length such as the length of the pultrusion being made.

The carrier tape with the wall spacer may take various forms depending upon the cross section of the tubular pultruded member. To function properly, however, in providing a substantially uniform wall thickness both the tape and the wall spacers should be capable of withstanding the temperatures involved in the pultrusion process. The spacers may be on the one surface of the carrier tape or alternatively extend through the tape. Alternatively, the carrier tape and spacers may be in the form of a wire frame or wire bead chain to provide the desired spacing between the outside of the mandrel and the inside of the die. The carrier tape and spacers can be made of materials selected to provide desirable properties in the pultruded member and accordingly, may be selected for their conductivity or insulating properties. They may be selected of the same or different material but must be able to withstand the temperature (typically 250° to 300° F.) of the pultrusion process without degrading. Ideally, they are selected to be compatible with the polymers used and bond to the polymers otherwise the carrier tape and spacers will delaminate and not provide the desired structural reinforcing properties. Typically, polyesters such as Mylar TM and other high temperature plastic materials may be used to provide the carrier tape and spacers. If insulating properties are desired a polyester carrier tape with polyester wall spacers uniformly spaced apart in the direction of the longitudinal axis may be used. Alternatively, if electrically conductive properties are desired, thin metal foil with metal spacers such as aluminum or steel may be used. Metal carrier tapes can provide electrical connectivity for grounds and power and/or signal voltages. Finally, if desired, a solid pultrusion such as that illustrated in cross section in FIG. 7 may be used as both the carrier tape and the spacer. Since this pultrusion is solid and not hollow, it is noted that the tolerance and wall thickness is much higher being controlled by the tool dimension to less than 4% deviation. When using the carrier tape with spacers together with a mat reinforcement, it is preferable to provide a hole in the mat reinforcement to enable the spacer to extend through it. To this end prepunched reinforcement mats may be used or if the spacer is a very hard solid such as steel may it allow the thickness of the mat to compress and poke itself through the mat. Alternatively, of course, a mat hole punching assembly may be placed ahead of the mat polymer bath.

Figure 4:
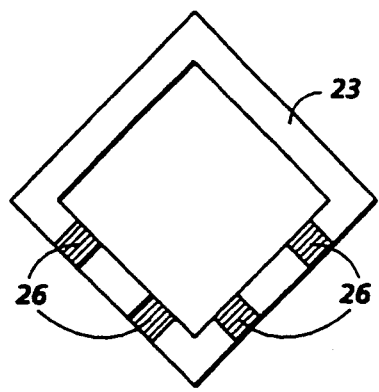
FIG. 4 is a cross sectional view of a tubular pultruded member wherein two sides of the member have spacers embedded therein.
Figure 5:
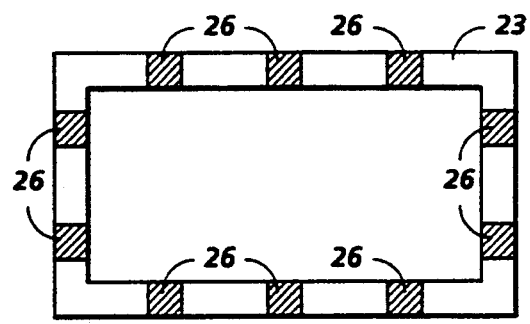
FIG. 5 is a cross sectional view of a tubular pultruded member having a rectilinear cross section wherein all four sides of the member have spacers embedded therein.
Figure 6:
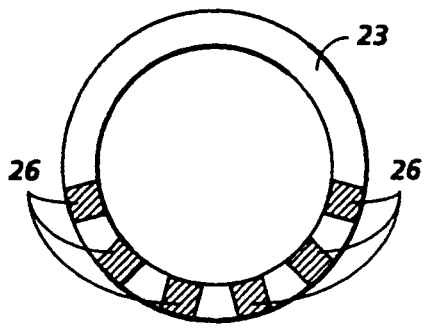
FIG. 6 is a cross sectional representation of a substantially circular pultruded member having a series of shaped wall spacers parallel to the longitudinal axis of the pultruded member.

Turning now to FIGS. 4, 5 and 6, three alternative cross sections of tubular pultruded members are illustrated wherein a substantially uniform wall thickness has been achieved according to the practice of the present invention. In FIG. 4 a tubular pultruded member having a rectilinear cross section is illustrated wherein carrier tapes with spacers have been incorporated or embedded in two contiguous sides of the rectangle which has been pulled through the pultrusion apparatus in the orientation illustrated thereby providing uniform spacing between the mandrel and the heated die on the two bottom surfaces and insuring substantially uniform wall thickness throughout. In FIG. 5, the rectilinear cross section is illustrated wherein carrier tape together with the spacers on it has been supplied during the pultrusion process to all four sides of the mandrel. FIG. 6 represents a generally circular hollow pultrusion wherein a carrier tape with spacers shaped according to the shape of the tubular pultruded member are provided that extend in a substantial arc along the bottom of the pultruded member as it emerges from the pultrusion die and mandrel apparatus. This is a geometry wherein only one carrier tape may be needed to provide a tubular hollow pultruded member having substantially uniform wall thickness.

Thus, according to the present invention a process for producing a tubular pultruded member having a substantially uniform wall thickness has been provided as well as the pultruded member itself. The tolerances in the wall thickness are much greater than in previous pultrusion processes and indeed come very close to those that may be achieved in injection molding or extrusion of tubular parts. By providing a high tolerance tubular member the need for final machining to get such a tolerance is avoided. This is particularly important in as much as fiberglass, a principle material used in both rovings and reinforcement mats in pultruded member, is not easy to machine or drill.

The disclosures of the cross referenced application and other references, including the Meyer book, referred to herein are hereby specifically and totally incorporated herein by reference.

While the invention has been described with reference to specific embodiments it will be apparent to those skilled in the art that many alternatives, modifications and variations may be made. Accordingly, it is intended to embrace all such alternatives and modifications as may fall within the spirit and scope of the appended claims.

We claim:

1. A tubular pultruded member having a longitudinal axis comprising a plurality of reinforcing fibers in a solid polymer matrix defining the wall of said tubular member, said wall having embedded therein a series of wall spacers parallel to said longitudinal axis, said wall spacers having the dimensions of the walls and wherein said wall spacers have been used to control the wall thickness of said tubular pultruded member during its manufacture when the fiber reinforced liquid polymer was drawn over a mandrel and through a die.

2. The tubular pultruded member of claim 1 wherein said series of wall spacers are the same thickness.

3. The tubular pultruded member of claim 1 wherein the wall thickness is substantially uniform throughout.

4. The tubular pultruded member of claim 1 wherein said reinforcing fibers are oriented in said matrix in a direction substantially parallel to said longitudinal axis.

5. The tubular pultruded member of claim 1 wherein said member has a substantially rectangular cross section and at least two sides thereof have wall spacers embedded therein and parallel to said longitudinal axis.

6. The tubular pultruded member of claim 5 wherein all four sides thereof have wall spacers embedded therein and parallel to said longitudinal axis.

7. The tubular pultruded member of claim 1 wherein said member has a substantially circular cross section.

8. The tubular pultruded member of claim 1 wherein said series of wall spacers are uniformly spaced apart in the direction of said longitudinal axis.

9. The tubular pultruded member of claim 8 wherein said wall spacers are on a carrier tape.

10. The tubular pultruded member of claim 9 wherein said carrier tape is electrically conductive.

11. The tubular pultruded member of claim 8 wherein said wall spacers are in a carrier tape.

12. The tubular pultruded member of claim 11 wherein said carrier tape is electrically conductive.

* * * * *